United States Patent
Butt et al.

(10) Patent No.: US 11,899,289 B2
(45) Date of Patent: Feb. 13, 2024

(54) CONTACT LENS FOR TREATING COLOR VISION DEFICIENCY AND METHOD OF MANUFACTURING SAME

(71) Applicant: Khalifa University of Science and Technology, Abu Dhabi (AE)

(72) Inventors: Haider Butt, Abu Dhabi (AE); Mohamed Elsherif, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 244 days.

(21) Appl. No.: 17/307,316

(22) Filed: May 4, 2021

(65) Prior Publication Data

US 2022/0357593 A1    Nov. 10, 2022

(51) Int. Cl.
| | |
|---|---|
| G02C 7/04 | (2006.01) |
| G02C 7/02 | (2006.01) |
| G02C 7/10 | (2006.01) |
| B29D 11/00 | (2006.01) |
| B29L 11/00 | (2006.01) |

(52) U.S. Cl.
CPC ........ G02C 7/049 (2013.01); B29D 11/00038 (2013.01); G02C 7/024 (2013.01); G02C 7/108 (2013.01); B29L 2011/0041 (2013.01); G02C 2202/10 (2013.01)

(58) Field of Classification Search
CPC ........ G02C 7/049; G02C 7/024; G02C 7/108; G02C 2202/10; G02C 7/04; G02C 7/104; B29D 11/00038; B29D 11/00048; B29D 11/00317; B29D 11/00432; B29D 11/00913; B29L 2011/0041
See application file for complete search history.

(56) References Cited

U.S. PATENT DOCUMENTS

| | | | |
|---|---|---|---|
| 4,998,817 A | | 3/1991 | Zeltzer |
| 5,451,237 A | * | 9/1995 | Vehige ............... G02B 1/043 |
| | | | 134/901 |
| 6,089,712 A | | 7/2000 | Harris |
| 6,149,692 A | * | 11/2000 | Lally ..................... D06P 3/58 |
| | | | 8/444 |
| 7,520,608 B2 | | 4/2009 | Shak et al. |
| 7,638,075 B2 | | 12/2009 | Quinn et al. |
| 7,931,369 B2 | | 4/2011 | Harris |

(Continued)

OTHER PUBLICATIONS

"Colour Blindness", C. B. Awareness, Available online at: <<http://www.colourblindawareness.org/colour-blindness/>>, Accessed on 2018, pp. 1-5.

(Continued)

*Primary Examiner* — Balram T Parbadia
*Assistant Examiner* — Gabriel A Sanz
(74) *Attorney, Agent, or Firm* — Billion & Armitage

(57) ABSTRACT

An ophthalmic contact lens configured to treat color vision deficiency is presented herein. The contact lens includes a tinted region containing either or both of a first dye that is configured to absorb at least 50% of incident light in a spectral band between 480 nanometers to 500 nanometers and a second dye that is configured to absorb at least 50% of incident light in a spectral band between 550 nanometers to 580 nanometers. A method of manufacturing such a contact lens and a process of forming an ophthalmic contact lens by an additive manufacturing process is also presented.

19 Claims, 4 Drawing Sheets

(56) References Cited

U.S. PATENT DOCUMENTS

| | | | |
|---|---|---|---|
| 8,414,127 B2 | 4/2013 | Harris | |
| 8,845,095 B2 | 9/2014 | Harding et al. | |
| 9,574,067 B2 | 2/2017 | Harding et al. | |
| 9,740,028 B1 | 8/2017 | Larson | |
| 10,606,100 B2 | 3/2020 | Schmeder et al. | |
| 11,143,887 B2 | 10/2021 | Waite et al. | |
| 2006/0069235 A1* | 3/2006 | Arnold | C08F 271/02 528/354 |
| 2006/0228560 A1* | 10/2006 | Stewart | C03C 17/3405 428/412 |
| 2007/0269851 A1* | 11/2007 | Sanders | C12Q 1/04 435/34 |
| 2010/0028436 A1 | 2/2010 | Ohrlander et al. | |
| 2011/0251299 A1* | 10/2011 | Cook | C08F 2/48 524/561 |
| 2013/0202551 A1* | 8/2013 | Satake | C08F 226/06 424/78.37 |
| 2013/0242255 A1 | 9/2013 | Otts et al. | |
| 2014/0178595 A1 | 6/2014 | Bothe et al. | |
| 2014/0221523 A1 | 8/2014 | Jan | |
| 2014/0253871 A1* | 9/2014 | Rosser | G02C 7/04 351/159.73 |
| 2016/0114542 A1 | 4/2016 | Quere et al. | |
| 2017/0160700 A1 | 6/2017 | Wang et al. | |
| 2017/0182681 A1 | 6/2017 | Meyers | |
| 2018/0169905 A1* | 6/2018 | Marullo | G02B 1/043 |
| 2019/0025611 A1 | 1/2019 | Saylor et al. | |
| 2020/0079006 A1* | 3/2020 | Kindt-Larsen | B33Y 10/00 |
| 2020/0132897 A1 | 4/2020 | Odhner et al. | |
| 2020/0156336 A1* | 5/2020 | Chauhan | G02C 7/04 |
| 2020/0387009 A1 | 12/2020 | Saha et al. | |
| 2021/0080754 A1* | 3/2021 | Valentine | G02C 7/108 |
| 2021/0187863 A1 | 6/2021 | Moine et al. | |
| 2021/0271109 A1* | 9/2021 | Yao | B29D 11/00894 |
| 2021/0340336 A1 | 11/2021 | Alhakimi et al. | |

OTHER PUBLICATIONS

"The Science Behind The Incredible Moment A Colour-Blind Grandpa Sees Colour For The First Time", Born to Engineer, 2017, 10 pages.

Alexander, et al., "Restoration of Cone Vision in a Mouse Model of Achromatopsia", Nature Medicine, vol. 13, 6, 2007, pp. 685-687.

Almutairi, et al., "Assessment of Enchroma Filter for Correcting Color Vision Deficiency", Pacific University Oregon, 2017.

Badawy, et al., "Contact Lenses for Color Blindness", Advanced Healthcare Materials, vol. 7, 1800152, Jun. 20, 2018, pp. 1-21.

Birch, "Efficiency of the Ishihara Test for Identifying Red-Green Colour Deficiency", Ophthalmic and Physiological Optics, vol. 17, 5, 1997, pp. 403-408.

Deeb, "Genetics of Variation in Human Color Vision and the Retinal Cone Mosaic", Current Opinion in Genetics & Development, vol. 16, Jun. 2006, pp. 301-307.

Dua, et al., "Computational Analysis of the Human Eye with Applications", World Scientific, Hackensack, 2011.

Flattau, "Considerations in Contact Lens Use Under Adverse Conditions: Proceedings of a Symposium", National Research Council US, 1991.

Flück, "Color Blind Essentials", Colblindor, Zürich, Switzerland, 2006.

Gomez-Robledo, et al., "Do EnChroma Glasses Improve Color Vision for Colorblind Subjects?", Optics express, vol. 26 ,22, 2018, pp. 28693-28703.

Mancuso, et al., "Gene Therapy for Red-Green Colour Blindness in Adult Primates", Nature, vol. 461, 7265, Oct. 8, 2009, pp. 784-787.

Martinez-Domingo, et al., "Assessment of VINO Filters for Correcting Red-Green Color Vision Deficiency", Optics Express, vol. 27,13, 2019, pp. 17954-17967.

Maxwell, "XVIII.—Experiments on Colour, as Perceived by the Eye, with Remarks on Colour-Blindness", Earth and Environmental Science Transactions of the Royal Society of Edinburgh, vol. 21, 2, 1857, pp. 275-298.

Porter, "What is Color? Enchroma Glasses, Neuroscience, and the Mystery of Color", Available Online at: <<https://www.blakeporterneuro.com/enchroma-neuroscience-color/>>, Aug. 18, 2015, pp. 1-30.

Salih, et al., "Ophthalmic Wearable Devices for Color Blindness Management", Advanced Materials Technologies, vol. 5, 8, 1901134., 2020, pp. 1-13.

Shinobu, "The Series of Plates Designed as a Test for Colour Deficiency, Kanehara", Kanehara Trading Inc. Tokyo, Japan, 2001, 6 pages.

Simunovic, "Colour Vision Deficiency", Eye, vol. 24, 2010, pp. 747-755.

Spalding, "Colour Vision Deficiency in the Medical Profession", British Journal of General Practice-Journal of the Royal College of General Practitioner, vol. 49, 443, 1999, pp. 469-476.

Swarbrick, et al., "The ChromaGen Contact Lens System: Colour Vision Test Results and Subjective Responses", Ophthalmic and Physiological Optics, vol. 21, 3, 2001, pp. 182-196.

Wolff, et al., "Physics-Based Vision: Principles and Practice: Shape Recovery", CRC Press, Boca Raton, vol. 3 not being provided, 1993, 544 pages. (Reference document not included).

Non-Final Office Action for U.S. Appl. No. 17/499,251; dated Jul. 6, 2023; 22 pages.

Final Office Action for U.S. Appl. No. 17/499,251 dated Dec. 6, 2023, 19 pages.

* cited by examiner

CONTACT LENS FOR TREATING COLOR VISION DEFICIENCY AND METHOD OF MANUFACTURING SAME

This patent application is directed to a contact lens for treating various forms of color vision deficiency and method of manufacturing a contact lens.

BACKGROUND

Human eyes see color via cone cells which are located in a 0.3 mm$^2$ spot of the retina near the back of the eye called the fovea centralis. There are three types of cone cells commonly referred to as blue, green and red photoreceptor cells. There are six to seven million cone cells in a human eye of which, 64% are red sensitive, 33% are green sensitive and 3% are blue sensitive.

Color vision deficiency (CVD) is caused when one or more of the cone types are faulty or absent due to mutation. This causes the brain to receive incomplete or incorrect information that prevents distinguishing between different colors. The type of CVD depends on the type of faulty or missing cone cell. Protanomaly results from the sensitivity of red cone cells being shifted to a shorter wavelength. This type of CVD affects 1.08% of males and 0.03% of females. Deuteranomaly occurs when the sensitivity of green cone cells is shifted to a longer wavelength. This is the most common form of CVD and affects 4.63% of males and 0.36% of females. In tritanomaly, the blue cone is displaced. This type of CVD is uncommon and affects only 0.0002% of males. If a cone is missing, the patient is diagnosed as having dichromacy, which is classified into three types:
  i) protanopia, where the red cone is missing which affects 1.01% of men and 0.02% of women,
  ii) deuteranopia, where the green cones are missing and affecting 1.27% of men and 0.01% of women, and
  iii) tritanopia, where the blue cones are missing.
Tritanopia is the most uncommon form of dichromacy and affects only 0.0001% of males. Protanomaly, deuteranomaly, protanopia and deuteranopia are all classified under the common term "red-green color blindness." The most severe kind of CVD is the monochromacy which arises when no cones or only blue cones are present. This is extremely rare and affects 0.00003% of males and results in the inability to perceive any colors.

"Normal" color vision is trichromatic, with color being created using all three different types of cones with the activation level in all three cones allowing the brain to determine the color. When light of a specific wavelength enters the eye, it excites the cones cells to a known activation level, and the combined signal from the different types of cone cells is analyzed by the brain and the color is observed. For example, when light of a wavelength of 520 nm is observed by normal individuals, the cones are activated at different levels: 0% for blue, 90% for green, and 55% for red. However, for protanomaly, the activation of the red cone cells to stimulation by 520 nm light is increased to 75% and for deuteranomaly, the activation of green cone cells is lowered to 60%. This causes the red and green cones to be activated to similar levels in protanomaly and deuteranomaly which results in the wrong color being perceived.

Despite the fact that many individuals have adapted to live with CVD, this condition affects them in many ways. In many countries, people who have CVD are not allowed to drive as some may not distinguish between the different colors of traffic lights and road signs. Suffering from CVD also prohibits individuals from entering some professions such as pilot or firefighter due to safety concerns over their visual disadvantage.

SUMMARY

According to one or more aspects of the present disclosure, an ophthalmic contact lens includes a tinted region containing at least one selected from a list consisting of a first dye configured to absorb at least 50% of incident light in a spectral band between 480 nanometers to 500 nanometers and a second dye configured to absorb at least 50% of incident light in a spectral band between 550 nanometers to 580 nanometers.

In one or more embodiments of the contact lens according to the previous paragraph, the first dye is a first rhodamine dye having an absorption peak at 500 nanometers and wherein the second dye is a second rhodamine dye having an absorption peak at 564 nanometers.

In one or more embodiments of the contact lens according to any one of the previous paragraphs, the tinted region is sized, shaped, and arranged to cover a pupil of an eye in which the contact lens is disposed and less than 10% of a surface area of an iris of said eye.

In one or more embodiments of the contact lens according to any one of the previous paragraphs, the first and second dyes are carboxytetramethylrhodamine dyes.

In one or more embodiments of the contact lens according to any one of the previous paragraphs, at least one of the first and second carboxytetramethylrhodamine dyes is copolymerized with 2-hydroxyethyl methacrylate.

In one or more embodiments of the contact lens according to any one of the previous paragraphs, the tinted region contains the first dye and not the second dye.

In one or more embodiments of the contact lens according to any one of the previous paragraphs, the tinted region contains the second dye and not the first dye.

In one or more embodiments of the contact lens according to any one of the previous paragraphs, the tinted region is a first tinted region containing the first dye and not the second dye and wherein the ophthalmic contact lens further comprises a second tinted region containing the second dye and not the first dye.

In one or more embodiments of the contact lens according to any one of the previous paragraphs, the contact lens comprises 2-hydroxyethyl methacrylate (HEMA), polyethylene glycol dimethacrylate, and 2,2-dimethoxy-2-phenylacetophenone.

In one or more embodiments of the contact lens according to any one of the previous paragraphs, a dye concentration of the first or second dye within the tinted region remains stable after exposure to a phosphate buffered saline solution for a period of at least one week.

In one or more embodiments of the contact lens according to any one of the previous paragraphs, a dye concentration within the tinted region remains stable after exposure to a hydroxypropyl methylcellulose solution for a period of at least one week.

According to one or more aspects of the present disclosure, method of forming an ophthalmic contact lens includes the steps of providing a solution comprising polyethylene glycol dimethacrylate, 2-hydroxyethyl methacrylate (HEMA), and 2,2-dimethoxy-2-phenylacetophenone, forming a first mixture of a first carboxytetramethylrhodamine dye and the solution, forming the first mixture into a desired shape, and curing the first mixture by exposure to ultraviolet light.

In one or more embodiments of the method according to the previous paragraph, the method further includes the steps of forming a second mixture of a second carboxytetramethylrhodamine dye and the solution, forming the second mixture into a desired shape over the cured first mixture, and curing the second mixture by exposure to ultraviolet light.

In one or more embodiments of the method according to any one of the previous paragraphs, the first carboxytetramethylrhodamine dye is configured to absorb at least 50% of incident light in a spectral band between 480 nanometers to 500 nanometers with an absorption peak at 500 nanometers.

In one or more embodiments of the method according to any one of the previous paragraphs, the second carboxytetramethylrhodamine dye is configured to absorb at least 50% of incident light in a spectral band between 550 nanometers to 580 nanometers with an absorption peak at 564 nanometers.

In one or more embodiments of the method according to any one of the previous paragraphs, the first carboxytetramethylrhodamine dye is configured to absorb at least 50% of incident light in a spectral band between 480 nanometers to 500 nanometers with an absorption peak at 500 nanometers.

In one or more embodiments of the method according to any one of the previous paragraphs, the ultraviolet light has a wavelength of 365 nanometers.

In one or more embodiments of the method according to any one of the previous paragraphs, the first mixture is exposed to the ultraviolet light for at least 5 minutes.

According to one or more aspects of the present disclosure, a process of forming an ophthalmic contact lens using an additive manufacturing process includes the steps providing a first liquid resin solution, forming the contact lens from the first liquid resin solution using an additive manufacturing process and curing the first liquid resin solution by exposure to ultraviolet light, dipping the contact lens formed by the additive manufacturing process into a second liquid resin solution, and curing the second liquid resin solution by exposure to ultraviolet light.

In one or more embodiments of the process according to the previous paragraph, the process further includes the steps of washing the contact lens with a first solvent to remove uncured first liquid resin solution after curing the first liquid resin solution by exposure to ultraviolet light and washing the contact lens with a second solvent to remove uncured second liquid resin solution after curing the second liquid resin solution by exposure to ultraviolet light.

In one or more embodiments of the process according to any one of the previous paragraphs, the first and second liquid resin solutions are selected from the list consisting of a first mixture of 2-hydroxyethyl methacrylate (HEMA) polyethylene glycol dimethacrylate, and 2,2-dimethoxy-2-phenylacetophenone and a second mixture of methacrylate and diphenyl (2,4,6-trimethylbenzoyl) phosphine oxide.

In one or more embodiments of the process according to any one of the previous paragraphs, the process additionally includes adding a first dye configured to absorb at least 50% of incident light in a spectral band between 480 nanometers to 500 nanometers or a second dye configured to absorb at least 50% of incident light in a spectral band between 550 nanometers to 580 nanometers to the first or second liquid resin.

DESCRIPTION OF THE DRAWINGS

The present invention will now be described, by way of example with reference to the accompanying drawings, in which.

DETAILED DESCRIPTION

Figure 1:
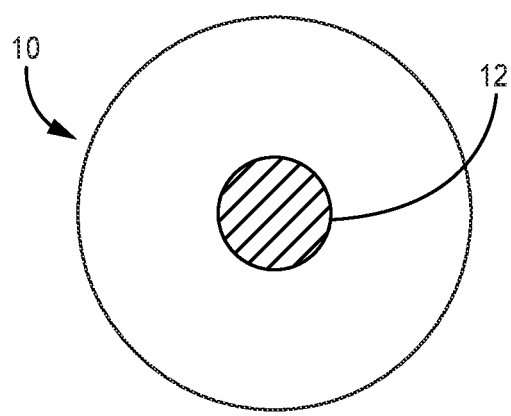
FIG. 1 is a front view of a contact lens having a tinted region, according to some embodiments.
Figure 2:
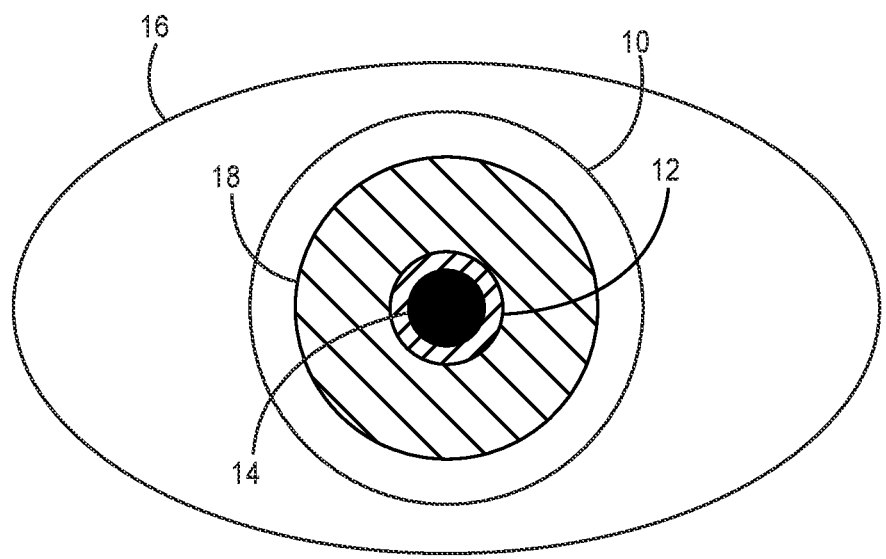
FIG. 2 is a front view of the contact lens of FIG. 1 disposed within an eye, according to some embodiments.

A contact lens that may be used to treat color vision deficiency (CVD) is described herein. As illustrated in FIGS. 1 and 2, the contact lens 10 has a tinted region 12 that is sized, shaped an arranged to cover the pupil 14 of the eye 16 in which the contact lens 10 is disposed. The tinted region 12 is preferably sized to cover the pupil 14 without covering a significant portion of the iris 18 surrounding the pupil so that it will not be easily noticeable that the contact lens wearer is using the contact lens 10 to treat CVD. Since the pupil 14 changes size depending on the intensity of incident light, the tinted region 12 may be sized to cover the pupil 14 for lower light intensity conditions in which cone vision is still active, but not necessarily cover the entire pupil 14 when vision is predominately rod based vision. The cones that sense the color on the retina are concentrated at the center of the fundus, that is, the central fovea and the surrounding elliptical shape, and the range corresponds to a viewing angle of about 10°. Since the radius of the cornea surface corresponding to this viewing angle of 1.0° is about 1.058 mm, a tinted portion having a diameter of about 2.1 mm is sufficient to correct CVD. The tinted region 12 may be sized so that it covers very little of the iris 18 so that it is not easily observable that the contact lens user is wearing a contact lens to treat CVD. The tinted region of the contact lens may cover less than 10% of the iris and preferably less than 5% of the iris.

The tinted region 12 includes a dye that is configured to block at least 50%, and preferably 50 to 100%, of incident light in the 480-500 nanometer wavelength range to treat blue-yellow color blindness (tritanomaly and tritanopia). The tinted region 12 may also or alternatively include a dye that is configured to block at least 50%, and preferably 50 to 100%, of incident light in the 550 to 580 nanometer wavelength range to treat red-green color blindness. The percentage of light blocked the dyes is dependent upon the particular needs of the contact lens wearer.

Figure 3:
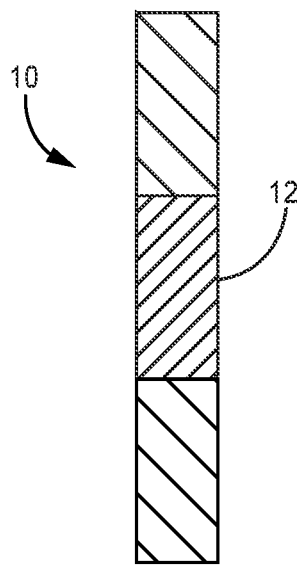
FIG. 3 is a cross section view the contact lens of FIG. 1, according to some embodiments.

In one embodiment, the contact lens 10 is made of a 2-hydroxyethyl methacrylate (HEMA) material has a tinted region 12 shown in FIG. 3 that contains a first rhodamine dye having an absorption peak at 564 nanometers. This first rhodamine dye is a carboxytetramethylrhodamine dye, such as ATTO 488 manufactured by ATTO-TEC GmbH. The concentration of the dye is in in the range of 0.000015% to 0.00003% by weight which is effective to block 50% to 100% of incident light in the 480 to 500 nanometer wavelength range. The contact lens 10 has an absorption peak in the 505 to 515 nanometer wavelength range. The first carboxytetramethylrhodamine dye is crosslinked with the HEMA material to provide a stable tinted region from which the dye will not leach into the eye or into a phosphate buffered saline contact lens storage solution. Carboxytetramethylrhodamine dyes are considered nontoxic for corneal cells. The shift in the absorption peak in the contact lens 10 to the 505 to 515 nanometer wavelength range is caused by the cross linking of the first carboxytetramethylrhodamine dye with the HEMA material.

In a second embodiment, the contact lens 10 is made of HEMA material and has a tinted region 12 shown in FIG. 3 that contains a second rhodamine dye having an absorption peak at 500 nanometers. This second rhodamine dye is a carboxytetramethylrhodamine dye, such as ATTO 565 also manufactured by ATTO-TEC GmbH. The concentration of the dye is in the range of 0.000015% to 0.00003% by weight which is effective to block 50% to 100% of incident light in the 550 to 580 nanometer wavelength range. The contact lens 10 has an absorption peak in the 560 to 570 nanometer wavelength range. The second carboxytetramethylrhodamine dye is crosslinked with the HEMA material to provide a stable tinted region from which the dye will not leach into the eye or a phosphate buffered saline contact lens storage solution.

Figure 4:
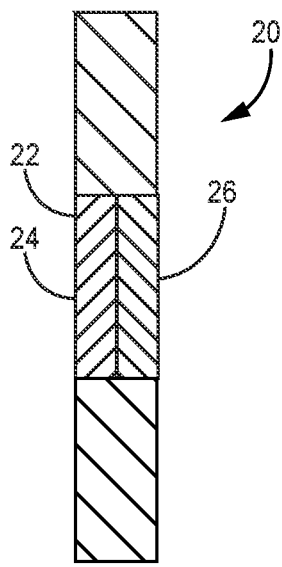
FIG. 4 is a cross section view a contact lens having two layers of the tinted region containing different colored dyes, according to some embodiments.

In a third embodiment, the contact lens 20 is has a tinted region 22 with two distinct layers 24, 26 as shown in FIG. 4. The first layer formed of a HEMA material with a first dye concentration effective to block 50% to 100% of incident light in the 480-515 nanometer wavelength range and a second layer formed of a HEMA material with a second dye concentration which is effective to block 50% to 100% of incident light in the 550 to 580 nanometer wavelength range. The contact lens 20 has two distinctive dips in its spectra transmitted through the contact lens 20 at wavelengths of 495 nm and 565 nm. In an alternative embodiment, the first layer formed of a HEMA material with a first dye concentration effective to block 50% to 100% of incident light in the 550 to 580 nanometer wavelength range and a second layer formed of a HEMA material with a second dye concentration which is effective to block 50% to 100% of incident light in the 480-515 nanometer wavelength range.

The first and second contact lenses 10 may be made using a method of mixing a solution comprising polyethylene glycol dimethacrylate (PEGDA), 2-hydroxyethyl methacrylate (HEMA), and 2,2-dimethoxy-2-phenylacetophenone (photoinitiator) with the first or second carboxytetramethylrhodamine dye. The ratio of the HEMA to PEGDA to photoinitiator is in the range of 20:1:1 to 10:10:1, by volume. The concentration of the carboxytetramethylrhodamine dye is in the range of in the range of 0.000015% to 0.00003% by weight. The mixture is then poured into a mold and the cured by exposure to an ultraviolet light source. The light source may provide energy in the range of 100 to 1200 $\mu J/cm^2$ at a wavelength of 365 nm. The mixture may be exposed to the ultraviolet light for a period of 2 to 30 minutes in order to cure the mixture.

The third contact lens 20 may be made by adding the steps of mixing another solution comprising polyethylene glycol dimethacrylate (PEGDA), 2-hydroxyethyl methacrylate (HEMA), and 2,2-dimethoxy-2-phenylacetophenone (photoinitiator) with whichever carboxytetramethyl-rhodamine dye was not used previously. The ratio of the HEMA to PEGDA to photoinitiator is in the range of 20:1:1 to 10:10:1, by volume. The concentration of the carboxytetramethyl-rhodamine dye is in the range of in the range of 0.000015% to 0.00003% by weight. The mixture is then poured into the mold over the previously formed layer and the cured by exposure to an ultraviolet light source. The light source may provide energy in the range of 100 to 1200 $\mu J/cm^2$ at a wavelength of 365 nm. The mixture may be exposed to the ultraviolet light for a period of 2 to 30 minutes in order to cure the mixture.

Alternatively, the contact lenses 10, 20, may be formed by an additive manufacturing (3D printing) process using a digital light processor printer having an ultraviolet light source and containing the solutions as described above.

The tinted area of the contact lens is stable when stored a hydroxypropyl methylcellulose (artificial tears) solution, such as TEARS NATURALE™ II manufactured by Alcon, or when stored in a phosphate buffered saline solution, such as ACUVUE™ REVITALENS® solution manufactured by Johnson & Johnson, for a period of at least one week.

Testing performed with deuteranopia subjects using the contact lenses 10 with the first dye to block 90% of light in the 480 to 500 nanometer wavelength range experienced 15% improvement in correctly identifying plates in the Ishihara test commonly used to evaluate CVD, while the contact lenses 10 with the second dye to block 90% of light in the 550 to 580 nanometer wavelength range provided about 20% improvement and the contact lens 20 provided about 23% improvement. Testing performed with deuteranomaly subjects using the contact lenses 10 with the first dye experienced a decrease of about 5% in correctly identifying plates in the Ishihara test while the contact lens 10 with the second dye provided about 11% improvement and the contact lens 20 provided about 25% improvement. Based on this testing, it is recommended that the contact lens 10, 20, used, the dye, and the dye concentration is customized to the individual person with CVD.

While the contact lenses 10, 20 described above are hydrogel contact lenses formed primarily from HEMA material, alternative contact lenses including the inventive features may be silicon hydrogel or hard contact lenses with a thin layer of HEMA material containing the tinted region described above.

Figure 5:
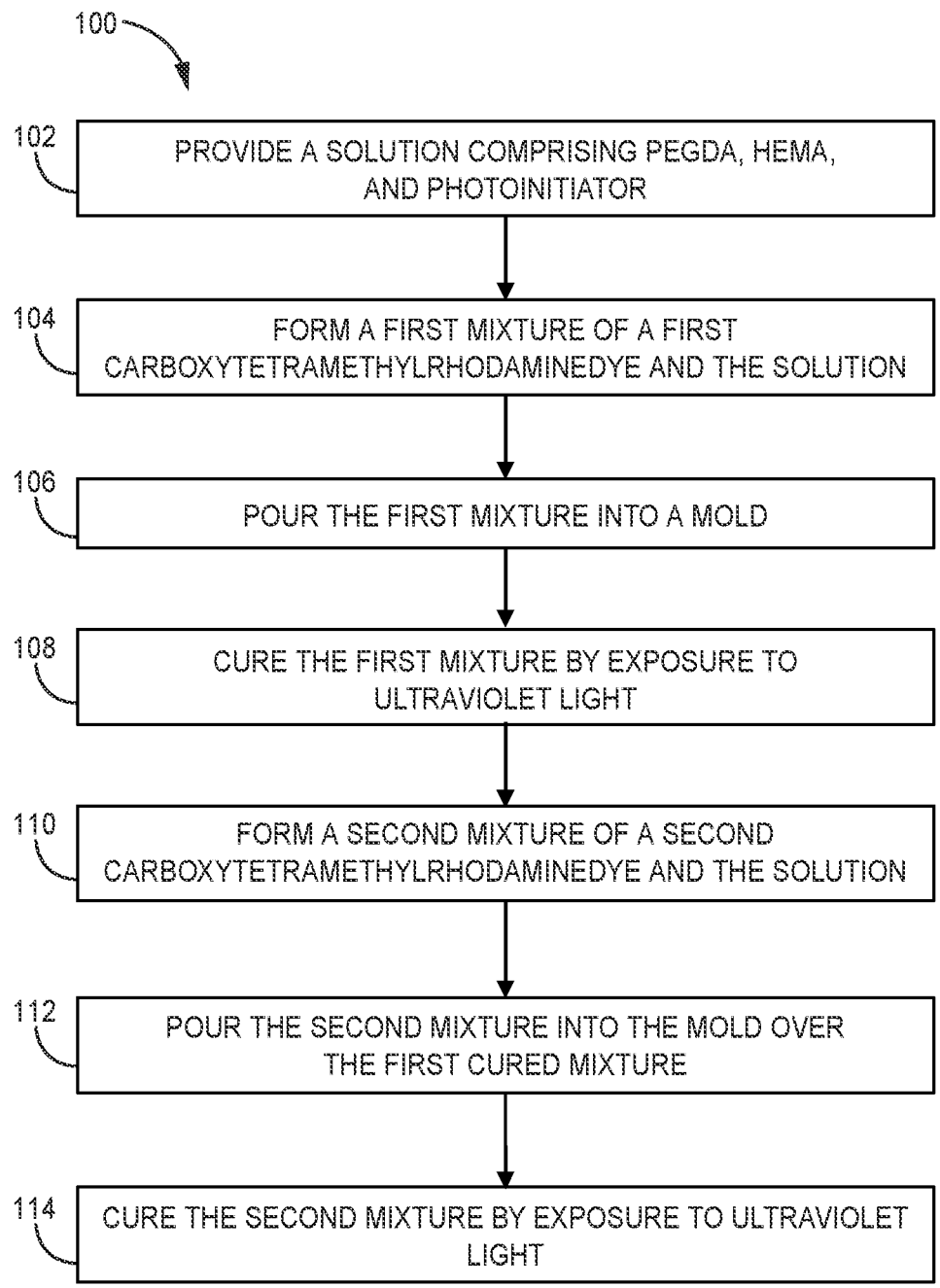
FIG. 5 is a flow chart of a method of forming the contact lenses of FIGS. 1-4, according to some embodiments.

A method 100 of forming a contact lens 10 with a tinted region 12 configured to treat CVD is shown in FIG. 5. The method 100 includes the steps of:

STEP 102, PROVIDE A SOLUTION COMPRISING PEGDA, HEMA, AND PHOTOINITIATOR, includes providing a solution that includes 2-hydroxyethyl methacrylate (HEMA), polyethylene glycol dimethacrylate (PEGDA), and a photoinitiator, e.g., 2,2-dimethoxy-2-phenylacetophenone;

STEP 104, FORM A FIRST MIXTURE OF A FIRST CARBOXYTETRAMETHYL-RHODAMINE DYE AND THE SOLUTION includes forming a first mixture of a first carboxytetramethylrhodamine dye and the solution of HEMA, PEGDA, and the photoinitiator;

STEP 106, FORM THE FIRST MIXTURE INTO A DESIRED SHAPE, includes forming the first mixture into a desired shape by pouring the mixture in to a mold shaped to form the contact lens 10 or using an additive manufacturing process;

STEP 108, CURE THE FIRST MIXTURE BY EXPOSURE TO ULTRAVIOLET LIGHT, includes curing the first mixture in the mold by exposure to ultraviolet light, e.g., ultraviolet light with a wavelength of 365 nm having an intensity in the range of 100 to 1200 $\mu J/cm^2$ for a period of 2 to 30 minutes or by using a digital light processor 3D printer having an ultraviolet light source;

STEP 110, FORM A SECOND MIXTURE OF A SECOND CARBOXY-TETRAMETHYLRHODAMINE DYE AND THE SOLUTION, is an optional step in forming the contact lens 20 that includes forming a second mixture of a second carboxytetramethylrhodamine dye and the solution of HEMA, PEGDA, and the photoinitiator;

STEP 112, FORM THE SECOND MIXTURE INTO A DESIRED SHAPE OVER THE FIRST CURED MIXTURE, is an optional step in forming the contact lens 20 that includes pouring the second mixture into the mold over the first cured mixture that remains in the mold to form a desired shape of the second mixture or forming the second mixture into a desired shape over the first cured mixture using an additive manufacturing process; and STEP 114, CURE THE SECOND MIXTURE BY EXPOSURE TO ULTRAVIOLET LIGHT, is an optional step in forming the contact lens 20 that includes curing the second mixture by exposure to ultraviolet light, e.g., ultraviolet light with a wavelength of 365 nm having an intensity in the range of 100 to 1200 µJ/cm$^2$ for a period of 2 to 30 minutes or by using a digital light processor 3D printer having an ultraviolet light source.

Figure 6:
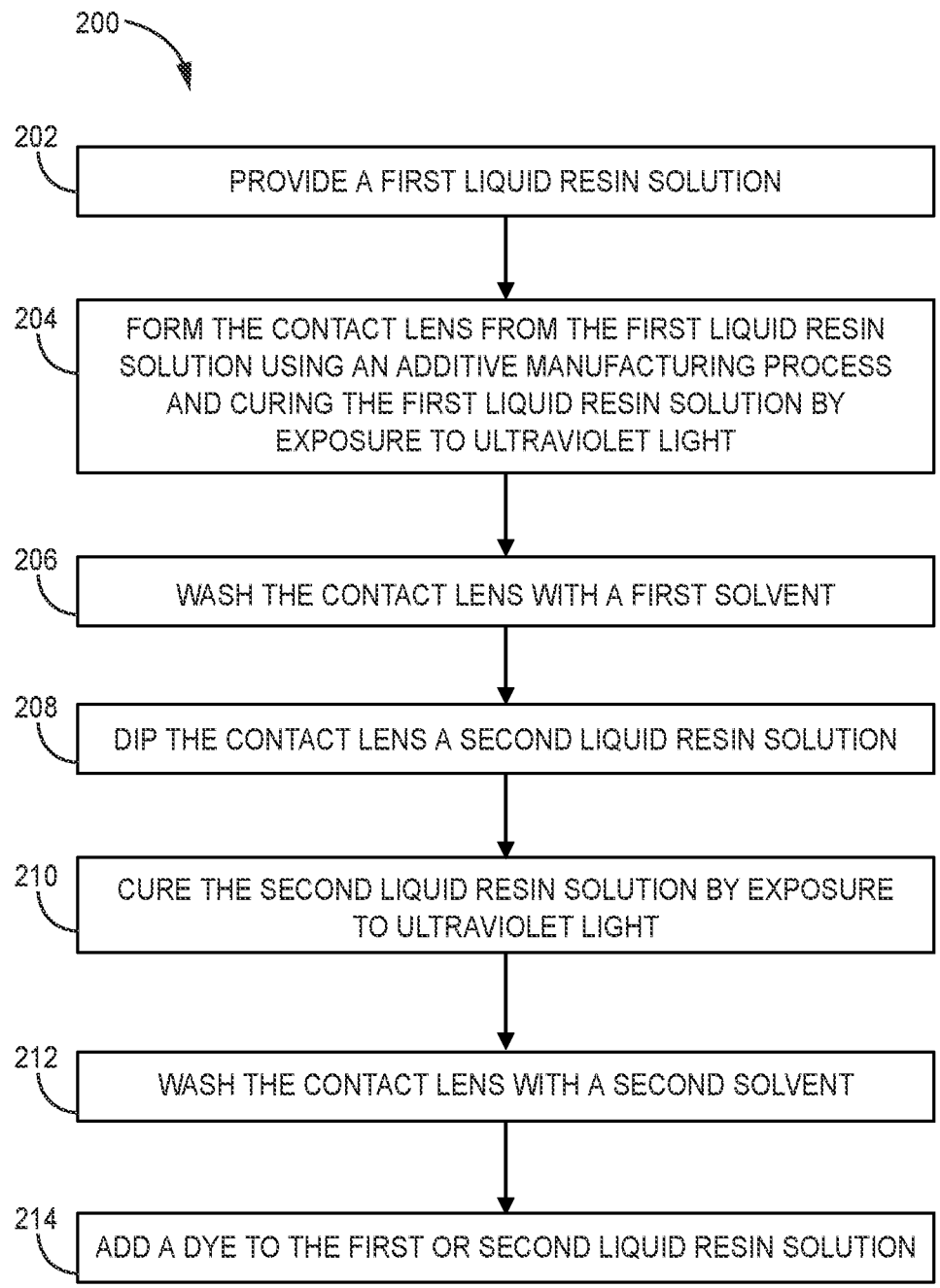
FIG. 6 is a flow chart of a process of forming a contact lens using an additive manufacturing process, according to some embodiments.

A process 200 of forming a contact lens 10 with a tinted region 12 configured to treat CVD using an additive manufacturing process, commonly known as a 3D printing process, is shown in FIG. 6. The process 200 includes the steps of:

STEP 202, PROVIDE A FIRST LIQUID RESIN SOLUTION, includes providing a first liquid resin solution. Two examples of a suitable first resin solution are a first mixture of 2-hydroxyethyl methacrylate (HEMA) polyethylene glycol dimethacrylate, and 2,2-dimethoxy-2-phenylacetophenone or a second mixture of methacrylate and diphenyl (2,4,6-trimethylbenzoyl) phosphine oxide;

STEP 204, FORM THE CONTACT LENS FROM THE FIRST LIQUID RESIN SOLUTION USING AN ADDITIVE MANUFACTURING PROCESS AND CURING THE FIRST LIQUID RESIN SOLUTION BY EXPOSURE TO ULTRAVIOLET LIGHT, includes loading the first liquid resin solution into an additive manufacturing device, such as a digital light printer (DLP) or a stereolithography apparatus (SLA) that is programmed to form the shape of the contact lens and any removeable support structures needed during the process of forming the contact lens. The contact lens is then formed from the first liquid resin solution using the additive manufacturing process. DLP and SLA are preferable over other additive manufacturing processes, such as selective laser sintering (SLS) and fused deposition modeling (FDM) due to higher resolution of printing and minimal thickness of the printed layers;

STEP 206, WASH THE CONTACT LENS WITH A FIRST SOLVENT TO REMOVE UNCURED FIRST LIQUID RESIN SOLUTION AFTER CURING THE FIRST LIQUID RESIN SOLUTION BY EXPOSURE TO ULTRAVIOLET LIGHT, is an optional step including washing the contact lens with a first solvent, e.g., isopropyl alcohol, to remove any remaining portions of the first liquid resin solution that remain uncured after exposing the first liquid resin solution to ultraviolet light;

STEP 208, DIP THE CONTACT LENS FORMED BY THE ADDITIVE MANUFACTURING PROCESS INTO A SECOND LIQUID RESIN SOLUTION, includes dip coating the contact lens that was formed by the additive manufacturing process by submerging the contact lens in a second liquid resin solution for a period of 30 seconds to one minute. The second liquid resin solution may preferably be the same as the first resin solution. Stair step features may be created between the layers forming the contact lens. The inventors have found that dipping the contact lens in the second liquid resin solution reduces and fills in stair step features at the edges of the layers, thereby improving surface smoothness and performance of the contact lens. The inventors discovered that post processing the context lens by dip coating improves optical transmittance of the resulting contact lens by about 30%;

STEP 210, CURE THE SECOND LIQUID RESIN SOLUTION BY EXPOSURE TO ULTRAVIOLET LIGHT, includes curing the second liquid resin solution by exposure to ultraviolet light for a period of one to two minutes;

STEP 214 WASH THE CONTACT LENS WITH A SECOND SOLVENT TO REMOVE UNCURED FIRST LIQUID RESIN SOLUTION AFTER CURING THE FIRST LIQUID RESIN SOLUTION BY EXPOSURE TO ULTRAVIOLET LIGHT, is an optional step including washing the contact lens with a second solvent which may be the same as the first solvent, e.g., isopropyl alcohol, to remove any remaining portions of the second liquid resin solution that remain uncured after exposing the second liquid resin solution to ultraviolet light; and STEP 212, ADD A FIRST DYE OR A SECOND DYE TO THE FIRST OR SECOND LIQUID RESIN SOLUTION, is an optional step that includes adding a first dye configured to absorb at least 50% of incident light in a spectral band between 480 nanometers to 500 nanometers or a second dye configured to absorb at least 50% of incident light in a spectral band between 550 nanometers to 580 nanometers to the first or second liquid resin solution so that the contact lens may be used to treat CVD. The dyes may preferably be a carboxytetramethylrhodamine dye when the first or second liquid resin solution is a mixture of 2-hydroxyethyl methacrylate (HEMA) polyethylene glycol dimethacrylate, and 2,2-dimethoxy-2-phenylacetophenone or a food grade dye when the first or second liquid resin solution is a mixture of methacrylate and diphenyl (2,4,6-trimethylbenzoyl) phosphine oxide. The carboxytetramethylrhodamine dyes are added to have a concentration of 0.000015% to 0.00003% by weight while the food grade dyes are added to have a concentration of about 2% by volume.

The additive manufacturing process may also be used to form microchannels at the edge of the contact lens 10 that may act as optical transducers by observing a change in the microchannel geometries with the help of images captured by a camera, e.g., a smart phones camera. For example, dry eye sensing can be performed by monitoring the spacing between or shape of the microchannels.

The inventors have also discovered that the surface finish and optical transmittance of the contact lens formed by the additive manufacturing process may be further improved by placing a thin film of PVC plastic on top of the print bed of the additive manufacturing apparatus thereby allowing easier removal of the contact lens from the print bed and a reduction in damage to the contact lens while removing it from the print bed.

A nanopattern may be formed on the surface of the contact lens via a holographic laser ablation apparatus. The holographic nanopattern integrated on the contact lenses can be utilized as a transducer to sense electrolyte concentration in the tears, which reflects the physiological state of the eye. Sensing the electrolyte concentration in tears could provide early detection of disease conditions in the eye.

The laser ablation process is carried out via direct laser interference patterning (DLIP) method in holographic Denisyuk reflection mode. To facilitate the interaction between the laser beams and the lens material, a black color dye placed on the surface of the contact lens.

The process of producing the nanopattern on the lens material includes the following steps:
a) the contact lens 10 is cleaned with isopropyl alcohol and placed on a glass slide;
b) a synthetic black dye is applied to the surface of the contact lens 10;
c) the holographic nanopattern is generated due to the interference between the incident and reflected laser beams.

Upon exposure to the laser, the ablative interference fringes are developed thereby forming a one-dimensional (1D) nanopattern on the surface of the 3D printed contact lens 10.

Because of the high energy in the constructive interference regions, the nanogrooves were produced on the surface of the contact lens. A high-power interference beam is produced when incident beam and reflected beam interacted and resulted in ablation of the surface of the contact lens 10. The grating spacing depend on the angle of exposure. For example, a grating spacing of 925 nm can be created at an exposure angle of 35° from the horizontal plane.

Accordingly, contact lenses 10, 20 configured for treating CVD and a method 100 and process 200 for manufacturing these contact lenses 10, 20 is presented herein. The use of using a dyed region to block out light with undesirable wavelengths, instead of quantum dots or nanoparticles, provides a lower cost and simplicity which make the contact lenses 10, 20 ideal for mass production. In addition, the carboxytetramethylrhodamine dye is nontoxic to the corneal tissue of the eye. Once the carboxytetramethylrhodamine dye is cross-linked with the HEMA material forming the lens, it is resistant to leaching into tears in the eye or contact lens storage solution, thereby providing a stable color in the tinted regions, 12, 22. It has also been found that crosslinking the carboxytetramethylrhodamine dye with the HEMA material does not affect the dye's chemical structure. In addition, the carboxytetramethylrhodamine dye has high thermal stability, has high photostability, and is slightly hydrophilic.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. An ophthalmic contact lens, comprising:
a tinted region containing at least one selected from a list consisting of a first carboxytetramethylrhodamine dye having a concentration in the range of 0.000015% to 0.00003% by weight and configured to absorb at least 50% of incident light in a spectral band between 480 nanometers to 500 nanometers and a second carboxytetramethyl-rhodamine dye having a concentration in the range of in the range of 0.000015% to 0.00003% by weight and configured to absorb at least 50% of incident light in a spectral band between 550 nanometers to 580 nanometers.

2. The ophthalmic contact lens according to claim 1, wherein the first dye has an absorption peak at 500 nanometers and wherein the second dye has an absorption peak at 564 nanometers.

3. The ophthalmic contact lens according to claim 1, wherein the tinted region is sized, shaped, and arranged to cover a pupil of an eye in which the contact lens is disposed and less than 10% of a surface area of an iris of said eye.

4. The ophthalmic contact lens according to claim 1, wherein at least one of the first and second carboxytetramethylrhodamine dyes is copolymerized with 2-hydroxyethyl methacrylate.

5. The ophthalmic contact lens according to claim 1, wherein the tinted region has a first layer containing the first dye and not the second dye and wherein the tinted region further comprises a second layer containing the second dye and not the first dye.

6. The ophthalmic contact lens according to claim 1, wherein the contact lens comprises 2-hydroxyethyl methacrylate (HEMA), polyethylene glycol dimethacrylate, and 2,2-dimethoxy-2-phenylacetophenone.

7. The ophthalmic contact lens according to claim 1, wherein the dye concentration of the first or second dye within the tinted region remains stable after exposure to a phosphate buffered saline solution for a period of at least one week.

8. The ophthalmic contact lens according to claim 1, wherein the dye concentration within the tinted region remains stable after exposure to a hydroxypropyl methylcellulose solution for a period of at least one week.

9. A method of forming an ophthalmic contact lens, comprising:
providing a solution comprising polyethylene glycol dimethacrylate, 2-hydroxyethyl methacrylate (HEMA), and 2,2-dimethoxy-2-phenylacetophenone;
forming a first mixture of the solution and a first carboxytetramethylrhodamine dye having a concentration in the range of 0.000015% to 0.00003% by weight configured to absorb at least 50% of incident light in a spectral band selected from a list consisting of 550 nanometers to 580 nanometers and 550 nanometers to 580 nanometers;
pouring the first mixture into a mold; and
curing the first mixture by exposure to ultraviolet light.

10. The method according to claim 9, further comprising:
forming a second mixture of the solution a second carboxytetramethylrhodamine dye having a concentration in the range of in the range of 0.000015% to 0.00003% by weight configured to absorb at least 50% of incident light in a spectral band selected from a list consisting of 550 nanometers to 580 nanometers and 550 nanometers to 580 nanometers;
forming the second mixture into a desired shape over the first cured mixture; and
curing the second mixture by exposure to ultraviolet light.

11. The method according to claim 10, wherein the first carboxytetramethyl-rhodamine dye is configured to absorb at least 50% of incident light in a spectral band between 480 nanometers to 500 nanometers with an absorption peak at 500 nanometers.

12. The method according to claim 10, wherein the second carboxytetramethyl-rhodamine dye is configured to absorb at least 50% of incident light in a spectral band between 550 nanometers to 580 nanometers with an absorption peak at 564 nanometers.

13. The method according to claim 9, wherein the first carboxytetramethyl-rhodamine dye is configured to absorb at least 50% of incident light in a spectral band between 480 nanometers to 500 nanometers with an absorption peak at 500 nanometers.

14. The method according to claim 9, wherein the first carboxytetramethyl-rhodamine dye is configured to absorb at least 50% of incident light in a spectral band between 550 nanometers to 580 nanometers with an absorption peak at 564 nanometers.

15. The method according to claim 9, wherein the ultraviolet light has a wavelength of 365 nanometers.

16. The method according to claim 9, wherein first mixture is exposed to the ultraviolet light for at least 5 minutes.

17. A process of forming an ophthalmic contact lens, comprising:
   providing a first liquid resin solution;
   forming the contact lens from the first liquid resin solution using a 3D printing process and curing the first liquid resin solution by exposure to ultraviolet light;
   dipping the contact lens formed by the 3D printing process into a second liquid resin solution;
   adding a first carboxytetramethylrhodamine dye having a concentration in the range of in the range of 0.000015% to 0.00003% by weight configured to absorb at least 50% of incident light in a spectral band between 480 nanometers to 500 nanometers or a second carboxytetramethylrhodamine dye having a concentration in the range of in the range of 0.000015% to 0.00003% by weight configured to absorb at least 50% of incident light in a spectral band between 550 nanometers to 580 nanometers to the first or second liquid resin; and
   curing the second liquid resin solution by exposure to ultraviolet light.

18. The process according to claim 17, further comprising:
   washing the contact lens with a first solvent to remove uncured first liquid resin solution after curing the first liquid resin solution by exposure to ultraviolet light; and
   washing the contact lens with a second solvent to remove uncured second liquid resin solution after curing the second liquid resin solution by exposure to ultraviolet light.

19. The process according to claim 17, wherein the first and second liquid resin solutions are selected from the list consisting of a first mixture of 2-hydroxyethyl methacrylate (HEMA) polyethylene glycol dimethacrylate, and 2,2-dimethoxy-2-phenylacetophenone and a second mixture of methacrylate and diphenyl (2,4,6-trimethylbenzoyl) phosphine oxide.

* * * * *